United States Patent [19]

Koons

[11] 4,077,928

[45] Mar. 7, 1978

[54] ASPHALT BASED COMPOSITIONS

[75] Inventor: Russell E. Koons, El Dorado, Ark.

[73] Assignee: Lion Oil Company, El Dorado, Ark.

[21] Appl. No.: 630,768

[22] Filed: Nov. 11, 1975

Related U.S. Application Data

[63] Continuation-in-part of Ser. No. 532,685, Dec. 13, 1974, abandoned.

[51] Int. Cl.² .............................................. C08L 95/00
[52] U.S. Cl. .......................... 260/28.5 AS; 106/273 N; 106/281 R; 208/44; 428/462; 428/468
[58] Field of Search ................................. 106/273–281; 260/28, 28.5 AS; 428/462, 468; 208/44

[56] References Cited

U.S. PATENT DOCUMENTS 3,574,652   4/1971   Alexander et al. .................. 106/278
3,637,558   1/1972   Verdol et al. ....................... 260/28.5

OTHER PUBLICATIONS

Abraham, Asphalts and Allied Substances, vol. 3, 6th Ed., 1960, pp. 76 & 77.
Kirk–Othmer, Encyclopedia of Chem. Tech., 2nd Ed., vol. 21, pp. 65–75.

*Primary Examiner*—Lorenzo B. Hayes

[57] ABSTRACT

A composition, especially useful for making coating compositions, and having unusually good properties, comprises at least one solvent extracted hard asphalt, at least one polyhydroxy polymer, and, optionally, at least one filler and at least one stable, non-volatile, tertiary amine catalyst. This composition, where combined with at least one polyisocyanate, forms a composition especially useful for coatings, particularly finish coatings.

7 Claims, No Drawings

ASPHALT BASED COMPOSITIONS

This application is a continuation-in-part application of U.S. application Ser. No. 532,685, filed Dec. 13, 1974, now abandoned.

BACKGROUND OF THE INVENTION

The present invention relates to a composition, especially coating compositions; a substrate such as pipe coated therewith; and a precursor composition and precursor component for use in preparing the coating composition.

Pipelines, such as crude oil and gas pipelines, which are buried in the ground are protected against deterioration by providing the pipelines with a protective coating. Such protective coatings are generally those prepared from an asphalt base. Although the presently available protective coatings have proved adequate when used for pipelines laid in the temperate and torrid zones of the world, they are not satisfactory in regard to their physical properties when used interchangeably either for pipelines laid in the frigid zones of the world where temperatures of $-30°$ F. to $-65°$ F. may be encountered, such as the northern slopes of Alaska, the Northern Territories of Canada and Siberia, where oil and gas deposits have been recently discovered, or for hot gas pipelines where temperatures of 200° F. to 250° F. are encountered downstream of compressor stations.

SUMMARY OF THE BROAD EMBODIMENTS OF THE INVENTION

Accordingly, the principal object of this invention is to provide new compositions that are particularly useful as coatings and especially as finish coatings.

Another object is to provide substrates coated, at least partially, with the compositions of this invention, particularly where the compositions form finish coatings on such substrates.

The precursor component comprises at least one solvent extracted hard asphalt having a penetration at 77° F. of about 0 to about 10, preferably about 0 to about 5,mm/10 as measured by ASTM D-5-65, and a softening point of about 165° F. to about 215° F. preferably about 170° F. as measured by ASTM D-36-70, and at least one intermediate polyhydroxy polymer having an average of at least about 1.8 predominantly primary, terminal, allylic hydroxyl groups per molecule that is an addition polymer of about 0 to about 75% by weight of an alpha-olefinic monomer of 2 to about 12 carbon atoms, and about 25% to 100% of a 1,3-diene hydrocarbon of 4 to about 12 carbon atoms, and having a viscosity at 30° C. of about 15 to about 5,000 poises, the majority of its unsaturation in the main carbon chain, and a number average molecular weight of about 400 to about 10,000. Preferably, the precursor component also comprises at least one mineral filler, including but not limited to fine mineral fillers. Preferably, the precursor component also comprises at least one stable, nonvolatile tertiary amine catalyst. Advantageously, the precursor component comprises at least one mineral filler and at least one stable, nonvolatile tertiary amine. These compositions are surprisingly stable at standard temperature and pressure, and have long shelf life, often several months or more.

By contrast to air-blown or vacuum distilled asphalts of comparable hardness, the asphalts of this invention are non-air-blown, and are prepared simply by solvent extraction. For example, these asphalts may be prepared by mixing an asphaltic flux or penetration grade asphalt with propane or a propane-$C_4$ and/or propane-$C_5$ hydrocarbon mixture and allowing the ingredients to separate into two layers. The solvent extracted asphalt is recovered from the bottom layer. Particularly useful solvent extracted asphalts are those prepared from a residuum of South Arkansas crude oil, although other crude oils may be used. These asphalts constitute about 50 to about 95, preferably about 70 to about 85, and most preferably about 70 to about 80, percent by weight of the precursor component.

The intermediate polyhydroxy polymer constitutes about 5 to about 40, preferably about 15 to about 30, and most preferably about 18 to about 22% by weight of the precursor component of this invention. These polymers are described in detail in U.S. Pat. No. 3,637,558, columns 3,4 and 5. However, the ranges of viscosities and molecular weights of the polymers suitable for use in the precursor component of this invention are those set forth above. The most highly preferred polymer is a liquid (at STP) hydroxyl terminated polybutadiene resin, most preferably having a molecular weight of about 2500.

Generally, the mineral filler may be one kind or two or more different kinds of such fillers. Preferably, the filler is a finely divided solid with more than about 99% passing through a number 325 mesh screen. Examples of solid fillers are powdered limestone, pulverized sand, silicas, clays, slate flour, and the like. Where filler forms a part of the precursor component of the invention, filler constitutes about 10 to about 29, preferably about 14 to about 24, and most preferably about 20% by weight of the precursor component.

The tertiary amine catalyst must be stable and nonvolatile for long periods, typically 24 hours or more, and at the processing temperatures of about 300° F. and higher at which these precursor components are employed. Amine catalysts constitute about 0.3 to about 2, preferably, about 0.5 to about 1, percent by weight of the precursor component composition.

The precursor may be made by mixing asphalt and filler, where filler is added, and heating the mixture to a temperature sufficient to dispel a substantial quantity of air and moisture, generally about 400° to about 500° F., and where necessary, adding one or more desiccants. The asphalt/filler mixture is then cooled, if necessary, to a temperature below which degradation of the other ingredients is substantially avoided. Thus, the mixture may be cooled to about 400° F., and mixed in a moisture-free environment with the intermediate polyhydroxy polymer. The mixture is cooled to about 325° F., and the tertiary amine, if any is desired, is added and mixed with the other ingredients to form the desired composition.

The precursor composition is especially useful for making compositions useful as coatings particularly finish coatings. These compositions comprise the ingredients of the precursor composition plus at least one polyisocyanate, preferably a diisocyanate, and more preferably a polyphenylmethylene polyisocyanate. The weight ratio of the precursor to the polyisocyanate is determined by substantially equalizing the sum of the reactivities of the polyhydroxy polymer in the precursor with the reactivity of the polyisocyanate. In general, the weight ratio of precursor to polyisocyanate is about 31 to 1 to about 61 to 1, preferably about 42 to 1 to about 52 to 1, and most preferably about 50 to 1. Upon mixing, the precursor and polyisocyanate react to produce a composition containing at least one urethane polymer, at least one solvent extracted asphalt and, optionally, mineral filler and/or tertiary amine catalyst.

The precursor/polyisocyanate compositions of this invention are particularly useful for coating substrates, especially metal substrates such as metallic pipe. In particular, the coating is advantageous for applying finish coatings to such substrates as steel and aluminum pipe. Generally, the coating may be from about 20 to about 150, preferably about 50 to about 110, and most preferably about 80, mils in thickness and will contain about 5 to about 40, preferably 15 to about 30 percent by weight urethane elastomer, and correspondingly, about 95 to about 60, and preferably about 85 to about 70 percent by weight of solvent extracted asphalt, and, where desired, filler and/or tertiary amine. Surprisingly, these compositions produce coatings of high tensile strength and elasticity, yet are quite tough and hard.

The coating may be applied by conventional techniques such as spraying. The rate of cure increases as the temperature of the precursor increases. The precursor is best kept warm and delivered to spray nozzles at about 330° F. or higher. Cure is accelerated by heating the coating at 150° F. and higher after application.

SUMMARY OF THE PREFERRED EMBODIMENTS OF THE INVENTION

An object of the present invention is to provide a pipe coating composition and pipe coated therewith which will not only withstand the rigorous low temperature climatic conditions encountered in the frigid zones of the world but will also withstand the elevated temperatures encountered in hot gas pipelines. A further object of the present invention is to provide a safe and effacious precursor composition and precursor component for use in preparing the pipe coating composition.

The present invention thus provides an improved pipe coating composition which comprises, in general, an asphalt, an in situ formed polyurethane elastomer, a filler and a catalyst, as well as pipe coated therewith. In addition, the present invention further provides a polyurethane-forming precursor composition and precursor component for use in preparing the improved pipe coating composition. The pipe coating composition possesses an unusual combination of physical properties not heretofore achieved which makes it ideally suitable for the coating of pipe to be laid under extremely cold climatic conditions or to be used for hot gas pipelines. The polyurethane-forming precursor composition and precursor component from which the pipe coating composition is prepared are such that the pipe coating composition can be prepared with safety and rapidity and without pollution by volatiles.

DESCRIPTION OF THE PREFERRED EMBODIMENTS

The precursor component for use in preparing the pipe coating composition comprises a blend of (a) from about 50% to about 75%, usually from about 55% to about 65%, and preferably about 60.5%, by weight of a solvent extracted hard asphalt having a penetration at 77° F. of from 0 to 10 mm/10, preferably from 0 to 5 mm/10 (ASTM D-5-65), and a softening point of from about 165° F. to about 215° F., preferably about 170° F. (ASTM D-36-70), (b) from about 10% to about 30%, usually from about 15% to about 25%, and preferably about 20%, by weight of a fine mineral filler, such as minus 325 mesh slate flour or silica, (c) from about 15% to about 30%, usually from about 18% to about 22%, and preferably about 18.5%, by weight of a liquid hydroxyl-terminated polybutadiene resin having a molecular weight of about 2500, such as the polyol resin R-45-HT of Arco Chemical Company, and (d) from about 0.3% to about 2%, usually from about 0.5% to about 1%, and preferably about 1%, by weight of a stable, nonvolatile, tertiary amine catalyst, such as methyl di-octadecyl amine (Armeen M2HT of Armak Company). The low penetration or hard solvent extracted asphalt, rather than an air blown or vacuum distilled asphalt of comparable hardness, and the above resin are used to insure their compatibility or miscibility with one another and to achieve the unusual physical properties for the pipe coating. A tertiary amine catalyst which is stable and nonvolatile at the lengthy (up to 24 hours) processing temperature conditions of about 300° F.–350° F., rather than the unstable and volatile primary, secondary or tertiary amines, is used to insure safety and efficacy without pollution by volatiles and to provide a satisfactory rapid processing and curing period. The presence of a fine mineral filler improves the physical properties of the pipe coating which would otherwise require a firm outer wrap.

The above precursor component, referred to hereinafter as Component (1), is prepared by heating the asphalt to about 400° F. and adding the filler while agitating the mixture. Some steam evolution occurs and entrapped air from the filler, so it is necessary to heat and slowly stir the mixture for about 20–60 minutes to obtain a smooth mixture free of bubbles. The resin is then added. The temperature of the added resin and the temperature of the filler-asphalt mixture are adjusted or controlled so that the temperature of the resultant mixture thereof does not exceed about 350° F. The mixture is agitated a few minutes to insure a uniform mixture and then the catalyst is added. The total mixture is stirred for about 20 minutes at above 300° F. to aid in the removal of traces of moisture that may remain. It can then be packaged in steel drums.

The precursor composition from which the pipe coating composition is prepared comprises the combination of a segregated or individually packaged two component system of the above Component (1) and a Component (2), namely, a polyphenylmethylene polyisocyanate, such as Mondur MRS (Mobay Chemical Company) or Papi (The Upjohn Company). The weight ratio of Component (1) to Component (2) in the two component system is determined by matching the reactivities of the hydroxylated resin (0.8 milliequivalents/gram) and the polyisocyanate (7.5 milliequivalents/gram). Thus the weight ratio of Component (1) to Component (2) is from about 31:1 to about 61:1, usually from about 42:1 to about 52:1, and preferably about 50:1.

The pipe coating composition of the invention comprises (a) from about 49% to about 73%, usually from about 54% to about 64%, and preferably about 59%, by weight of a solvent extracted hard asphalt having a penetration at 77° F. of from 0 to 10 mm/10, preferably from 0 to 5 mm/10, and a softening point of from about 165° F. to about 215° F., preferably about 170° F., (b) from about 10% to about 29%, usually from about 14% to about 24%, and preferably about 20%, by weight of a fine mineral filler, such as minus 325 mesh slate flour or silica, (c) from about 17% to about 32%, usually from about 18% to about 21%, and preferably about 20%, by weight of an in situ formed polyurethane elastomer which is the reaction product of a liquid hydroxyl-terminated polybutadiene resin having a molecular weight of about 2500 and a polyphenylmethylene polyisocyanate and (d) from about 0.3%, usually from about 0.5% to about 1%, and preferably about 1%, by weight of a stable, nonvolatile, tertiary amine catalyst, such as methyl di-octadecylamine.

The pipe coating composition is prepared from its precursor composition containing Components (1) and (2) and applied to steel pipe in the following manner. The pipe to be coated is cleaned by shot blasting and warmed to about 150° F., because the coating adheres better to warm steel than to cold steel. A primer, such as an aromatic solvent (xylene or toluene) or an aromatic solvent containing equal weight quantities of a bitumen or aromatic tar and a high viscosity grade of chlorinated rubber, may be used and should be sprayed on the pipe a short time before application of the coating. Although the primer may be dry to the touch, some retained solvent will improve the adhesion of the applied coating.

To apply the coating, Component (1) is heated to about 350° F. and pumped in a steady proportioned flow into an inline mixer. The small amount of Component (2) at about 80° F. to about 120° F. is also proportioned into the inlet of the inline mixer where it is thoroughly mixed with Component (1) at about 350° F. Once mixed, the mixture will gel to a very high viscosity mass within about 45 to about 65 seconds. Thus, the fresh mixture is immediately sprayed on the warmed pipe so as to have time to flow out smooth before gelling occurs and also to thoroughly mix at the overlap edge with the coating already sprayed on the pipe. Generally, the spray is applied in a spiral pattern by rotating the pipe while the spray unit moves down the pipe, or the pipe moves by the spray unit. It may be desired in many cases, due to the fexibility of the coating, to apply a conventional pipeline felt or a polyethylene tape as an outer wrap to the coated pipe so as to impart greater skin resistance to the coating. In this case, the outer wrap is applied before gelling occurs.

To insure an advanced stage reaction well beyond the gelling stage, the warm pipe (about 150° F.) is removed from the coating operation on end hooks, or other supports, so as to remain warm for about 20 minutes. It is then sprayed with cooling water and rolled onto the storage rack. Some reaction of the active ingredients will continue to occur for the next few days, the complete reaction depending upon the storage temperature of the pipe.

The unusual and highly desirable combination of physical properties possessed by the pipe coating composition of the invention are illustrated by the physical properties of the preferred pipe coating tabulated in Table I below. The preferred pipe coating whose properties are set forth in Table I was made by reacting 48 to 50 parts of Component (1) with 1 part of Component (2) where Component (1) consists of 60.5% by weight of solvent extracted asphalt having a penetration of 3–5 and a softening point of 168° F. to about 176° F., 20% by weight of −325 mesh slate flour, 18.5% by weight of a polybutadiene homopolymer having a viscosity of 50 poises at 30° C., a hydroxyl content of 0.95 milliequivalents per gram, a hydroxyl numbers (millieq. KOH/gram) of 53, and average molecular weight of 2200 to 2500, about 2.1 to 2.2 predominantly primary, terminal, allylic hydroxyl groups, and an iodine number of 398 (Arco Chemical Company's R45HT), and 1% by weight of Armeen M2HT, a tertiary amine catalyst. Component (2) was the polyphenylmethylene polyisocyanate sold under the trade name Papi (Upjohn Company). A typical analysis of this material is:

| | |
|---|---|
| Isocyanate Equivalent (Dibutylamine Reaction) | 133.5 |
| Viscosity at 77° F, Centipoises | 250 |
| Specific Gravity | 1.2 |
| Flash Point, Cleveland Open Cup, ° F. | 425 |
| NCO Content by Weight, % | 31.5 |

TABLE I

| TEST | VALUE |
|---|---|
| Hardness (Shore "A") at 77° F. | 45/55 |
| Tensile Strength, 77° F., lbs./in.$^2$ | 180/220 |
| Elongation at break, % | 400/500 |
| Impact Resistance (A.S.T.M. G-14-72) | |
| Inch Pounds 77° F. | 35/45 |
| 0° F. | 45/60 |
| −30° F. | 55/70 |
| Low Temperature Crack (coated pipe exposed to −64° F. temperature for 6 hours) | No Cracks |
| High Temperature Flow (coated pipe exposed to 225° F. temperature for 6 hours) | No Flow |
| Abrasion Resistance, 10 passes with sandblaster | No Loss of Coating |
| Cathodic Disbonding, 7 days, in.$^2$ (A.S.T.M. G-8-72) | 0.10 |

From the above table, it will be noted that the pipe coating composition of the invention not only possesses unusually high resistance to low temperature cracking and high temperature flow, resistance to cathodic disbonding and resistance to low temperature impact damage, but also possesses unusually high tensile strength and elasticity. As a consequence, the pipe coating composition is capable of recovery from a deformed position caused by tension or compression. Thus, complete recovery occurs from a tension or compression distortion of 20% when the force is removed. Almost complete recovery occurs with much larger distortions, but several hours are required to do so.

The pipe coating composition of the invention, as noted above, is especially suitable for use on pipes in northern regions where the coated pipes are often subjected to very low temperatures before they are welded and buried in the ground. The pipe coating is also useful on hot gas pipelines. Because of the elastomer present in the coating, it will resist higher temperature without slumping than conventional asphalt coatings, so it is useful for many pipelines in regions of more moderate temperatures. Since it is stronger than conventional asphalt coatings, it is useful in areas where soil stress is a problem in deforming the pipe coatings.

Although the coating composition of the invention finds particular utility in the coating of steel pipe subjected to either very low tempertures or elevated temperatures, it can also be used in roofing membranes; in a liner for canals, irrigation and drainage ditches which are sprayed in place; as a coating for structural steel and steel tanks; as a coating for the protection of insulation from the weather; and as an adhesive for insulation.

Although, as mentioned above, the precursor composition is normally a combination or kit of a segregated or individually packaged two component system of Component (1) and Component (2), one could, if desired, subdivide the materials of Component (1) into a number of individual packages, for example, a package containing the asphalt and filler and a package or packages containing the resin and/or catalyst, provided care is exercised in proportioning or metering together the various materials to form either Component (1) or form the final coating composition.

What is claimed is:

1. A coating composition for use in coating pipes which will withstand low temperature climatic conditions said composition consisting essentially of:
   a. from about 49% to about 73% by weight of a solvent extracted hard asphalt having a penetration at 77° F. of from 0 to 10 mm/10 and a softening point of from about 165° F. to about 215° F.,
   b. from about 10% to about 29% by weight of a fine mineral filler,
   c. from about 17% to about 32% by weight of a polyurethane elastomer formed in situ in the presence of said asphalt by the reaction of a liquid hydroxyl-terminated polybutadiene resin having a molecular weight of about 400 to 10,000 and a polyphenylmethylene polyisocyanate, the weight ratio of said polybutadiene resin and polyisocyanate being sufficient to form a polyurethane elastomer when said polybutadiene is reacted with said polyisocyanate, and
   d. from about 0.3% to about 2% by weight of a tertiary amine catalyst which is stable and nonvolatile at a temperature of from about 300° F. to 350° F.

2. The coating composition defined by claim 1 wherein the amounts by weight of materials (a), (b), (c) and (d) are from about 54% to about 64%, from about 14% to about 24%, from about 18% to about 21% and from about 0.5% to about 1%, respectively.

3. The coating composition of claim 1, wherein said nonvolatile, tertiary amine catalyst is methyl di-octadecylamine.

4. A method of coating pipes which comprises applying to said pipe a coating composition which will withstand low temperature climatic conditions, said coating composition being applied to said pipe prior to gelling, said coating composition consisting essentially of a homogeneous admixture of from about 49% to 73% by weight of at least one solvent extracted hard asphalt having a penetration at 77° F. of about 0 to about 10 mm/10, and a softening point of about 165° F. to about 215° F., from about 10% to 29% by weight of a fine mineral filler, a catalytic effective amount of a tertiary amine catalyst which is stable and nonvolatile at a temperature of from about 300° F. to 350° F., at least one intermediate polyhydroxy polymer having an average of at least about 1.8 predominantly primary, terminal, allylic hydroxyl groups per molecule and being an addition polymer of 0 to about 75% by weight of an alpha-olefinic monomer of 2 to about 12 carbon atoms, and about 25 to 100% of a 1, 3-diene hydrocarbon of 4 to about 12 carbon atoms, said intermediate polymer having a viscosity at 30° C. of about 15 to about 5,000 poises, the majority of its unsaturation in the main carbon chain, and an average molecular weight of about 400 to about 10,000 and at least one polyisocyanate, the weight ratio of said intermediate polyhydroxy polymer to polyisocyanate being sufficient to form a urethane polymer when said intermediate polyhydroxy polymer is reacted with said polyisocyanate.

5. A method according to claim 4, wherein said nonvolatile tertiary amine is methyl di-octadecylamine.

6. A pipe coated at least partially with a coating composition which will withstand low temperature climatic conditions, said pipe composition consisting essentially of from about 49% to 73% by weight of at least one solvent extracted hard asphalt having a penetration at 77° F. of 0 to about 10 mm/10 and a softening point of about 165° F. to about 215° F., from about 10% to 29% by weight of a fine mineral filler, a catalytic effective amount of a tertiary amine catalyst which is stable and nonvolatile at a temperature of from about 300° F. to 350° F., and from about 17% to 32% of at least one urethane polymer formed in situ in the presence of said asphalt by the reaction of at least one intermediate polyhydroxy polymer having an average of at least about 1.8 predominantly primary, terminal, allylic hydroxyl group per molecule and being an addition polymer of about 0 to about 75% by weight of an alpha-olefinic monomer of 2 to about 12 carbon atoms, and about 25% to 100% of a 1, 3-diene hydrocarbon of 4 to about 12 carbon atoms, said intermediate polymer having a viscosity at 30° C. of about 15 to about 5,000 poises, the majority of its unsaturation in the main carbon chain, and a number average molecular weight of about 400 to about 10,000 with at least one polyisocyanate, the weight ratio of said intermediate polyhydroxy polymer to polyisocyanate being sufficient to form a urethane polymer when said intermediate polyhydroxy polymer is reacted with said polyisocyanate.

7. The pipe of claim 6, wherein said nonvolatile tertiary amine catalyst is methyl di-octadecylamine.

* * * * *